United States Patent
Wu (10) Patent No.: US 11,554,459 B2
(45) Date of Patent: Jan. 17, 2023

(54) ELECTRIC SANDER MOTOR

(71) Applicant: BASSO INDUSTRY CORP., Taichung (TW)

(72) Inventor: Jian-Rung Wu, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 429 days.

(21) Appl. No.: 16/827,550

(22) Filed: Mar. 23, 2020

(65) Prior Publication Data
US 2020/0298367 A1    Sep. 24, 2020

(30) Foreign Application Priority Data

Mar. 22, 2019 (TW) ................................. 108203539

(51) Int. Cl.
| | |
|---|---|
| *H02K 1/27* | (2022.01) |
| *B24B 47/12* | (2006.01) |
| *H02K 1/278* | (2022.01) |
| *H02K 7/08* | (2006.01) |
| *H02K 7/14* | (2006.01) |
| *H02K 21/16* | (2006.01) |
| *B24B 23/02* | (2006.01) |

(52) U.S. Cl.
CPC ............ *B24B 47/12* (2013.01); *H02K 1/278* (2013.01); *H02K 7/083* (2013.01); *H02K 7/145* (2013.01); *H02K 21/16* (2013.01); *B24B 23/02* (2013.01)

(58) Field of Classification Search
CPC ........ H02K 7/145; H02K 7/083; H02K 7/003; H02K 7/075; H02K 5/1732; B24B 23/02; B24B 23/03; B24B 47/12
See application file for complete search history.

(56) References Cited

U.S. PATENT DOCUMENTS

| | | | | |
|---|---|---|---|---|
| 3,364,625 | A * | 1/1968 | Sogge ..................... | B24B 23/03 451/357 |
| 7,386,137 | B2 * | 6/2008 | Combest ................ | H04R 9/063 381/396 |
| 7,556,580 | B2 * | 7/2009 | Saito ....................... | H02K 7/116 475/149 |
| 10,414,014 | B2 * | 9/2019 | Hafele .................... | B24B 23/03 |
| 2019/0283202 | A1 * | 9/2019 | Nybacka ................ | B24B 23/04 |
| 2020/0254580 | A1 * | 8/2020 | Valentini ................ | B24B 41/04 |
| 2022/0048158 | A1 * | 2/2022 | Ruhland ................. | F16F 15/36 |

* cited by examiner

*Primary Examiner* — Dang D Le
(74) *Attorney, Agent, or Firm* — Chun-Ming Shih; HDLS IPR Services (57) ABSTRACT

An electric sander motor includes a motor main body (100), a power axial shaft (210) and a sleeve (220). The motor main body (100) includes a rotor (110) and a stator (120) surrounding the rotor (110). The power axial shaft (210) includes an axial hole (211) extending along a central axis of the power axial shaft (210). The sleeve (220) includes one open end and another closed end extended outward to form an eccentric axial shaft (221) penetrating through the axial hole (211). A central axis of the eccentric axial shaft (211) is parallel with a central axis of the sleeve (220) and spaced apart therefrom. The power axial shaft (210) penetrates through the rotor (110), and the sleeve (220) is outside the motor main body (100). The assembly is facilitated by assembling the power axial shaft (210) and the sleeve (220) onto the motor main body (100) sequentially.

10 Claims, 8 Drawing Sheets

ELECTRIC SANDER MOTOR

BACKGROUND OF THE INVENTION

Field of the Invention

The technical field relates to an electric sander motor, in particular, to an electric sander motor with a biaxial split-type eccentric transmission assembly.

Description of Related Art

Nowadays, electric sanders typically include a motor main body and a sanding rotary disk. The motor main body and the sanding rotary disk are connected to each other via an eccentric axial shaft. During the operation, the eccentric axial shaft is able to drive the sanding rotary disk to move around the central axis of the motor main body. In general, the eccentric axial shaft comprises a shaft, and the shaft includes one end penetrating into the motor main body and another end provided with a sleeve for the sanding rotary disk to be installed thereon. In addition, the shaft and the sleeve are configured in a non-coaxial arrangement. Since the shaft and the sleeve are integrally connected to each other, when assembly personnel penetrate the shaft into the motor main body, the sleeve in an eccentric arrangement is likely to hinder the vision of the assembly personnel. Moreover, due to the weight of the eccentric shaft deviates toward one side, alignment of such component parts can be difficult during the assembly.

In view of above, the inventor seeks to overcome the aforementioned drawback associated with the currently existing technology after years of research and development along with the utilization of academic theories, which is also the objective of the development of the present invention.

SUMMARY OF THE INVENTION

The present invention provides an electric sander motor equipped with a biaxial split-type eccentric transmission assembly.

The present invention provides an electric sander motor, comprising a motor main body, a power axial shaft and a sleeve. The motor main body includes a rotor and a stator configured to surround the rotor therein. The power axial shaft includes one end formed of an axial hole thereon, and the axial hole extends along a central axis of the power axial shaft. The sleeve includes one end configured to be an open end and another end configured to be a closed end and extended outward to form an eccentric axial shaft penetrating through the axial hole. A central axis of the eccentric axial shaft is arranged parallel with a central axis of the sleeve and spaced apart from each other. In addition, the power axial shaft penetrates through the rotor, and the sleeve is arranged outside the motor main body.

The electric sander motor of the present invention further comprises an output axle, and the output axle is arranged coaxially with the sleeve. The sleeve includes a bearing therein, and the output axle penetrates through the bearing.

For the electric sander motor of the present invention, the eccentric axial shaft is fastened onto the axial hole. One side of the sleeve includes a counter weight, and a central axis of the counter weight and the central axis of the sleeve are arranged opposite from each other to be at two sides of the eccentric axial shaft, respectively.

For the electric sander motor of the present invention, the stator comprises a plurality of coils arranged to surround the rotor. The rotor comprises a plurality of magnets arranged to surround the power axial shaft.

For the electric sander motor of the present invention, the motor main body includes at least one bearing arranged therein, and the power axial shaft penetrates through the bearing. A root portion of the eccentric axial shaft includes a protruding boss extended in a radial direction, and the protruding boss penetrates through the bearing.

For the electric sander motor of the present invention, an inner side of the rotor includes an inner locking slot, and an outer side of the power axial shaft includes an outer locking slot; the rotor is locked onto the power axial shaft via a locking member; the locking member is locked into the inner locking slot and the outer locking slot.

For the electric sander motor of the present invention and its eccentric transmission assembly, they are equipped with the power axial shaft and the sleeve assembled to connect with each other. During the assembly, the power axial shaft is assembled onto the motor main body first, followed by assembling the sleeve onto the power axial shaft. Accordingly, it is able to prevent the sleeve from hindering the penetration of the power axial shaft into the motor main body; therefore, such configuration is able to facilitate the assembly process.

DETAILED DESCRIPTION OF THE INVENTION

Figure 1:
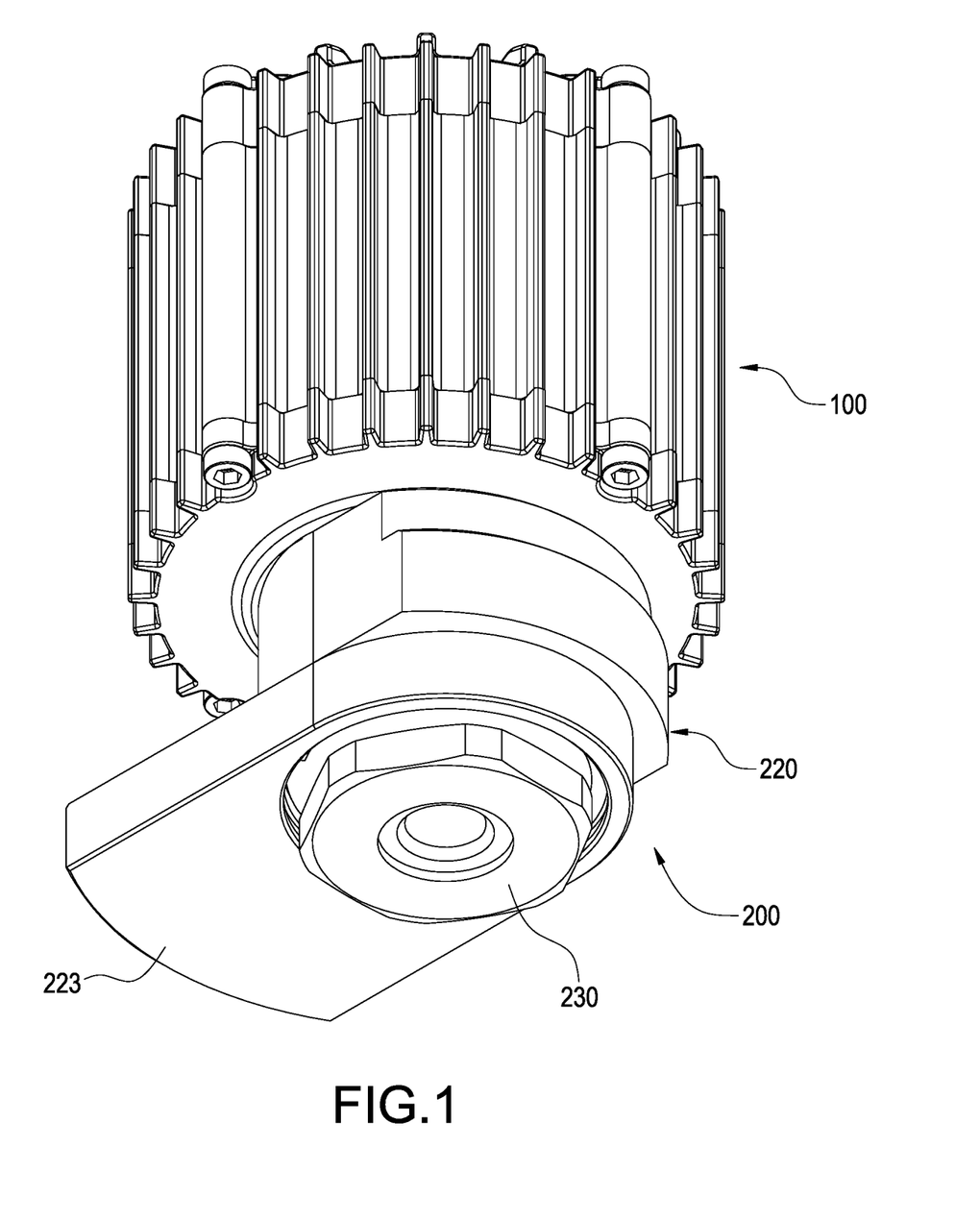
FIG. 1 is a perspective view of the electric sander motor according to an exemplary embodiment of the present invention.
Figure 2:
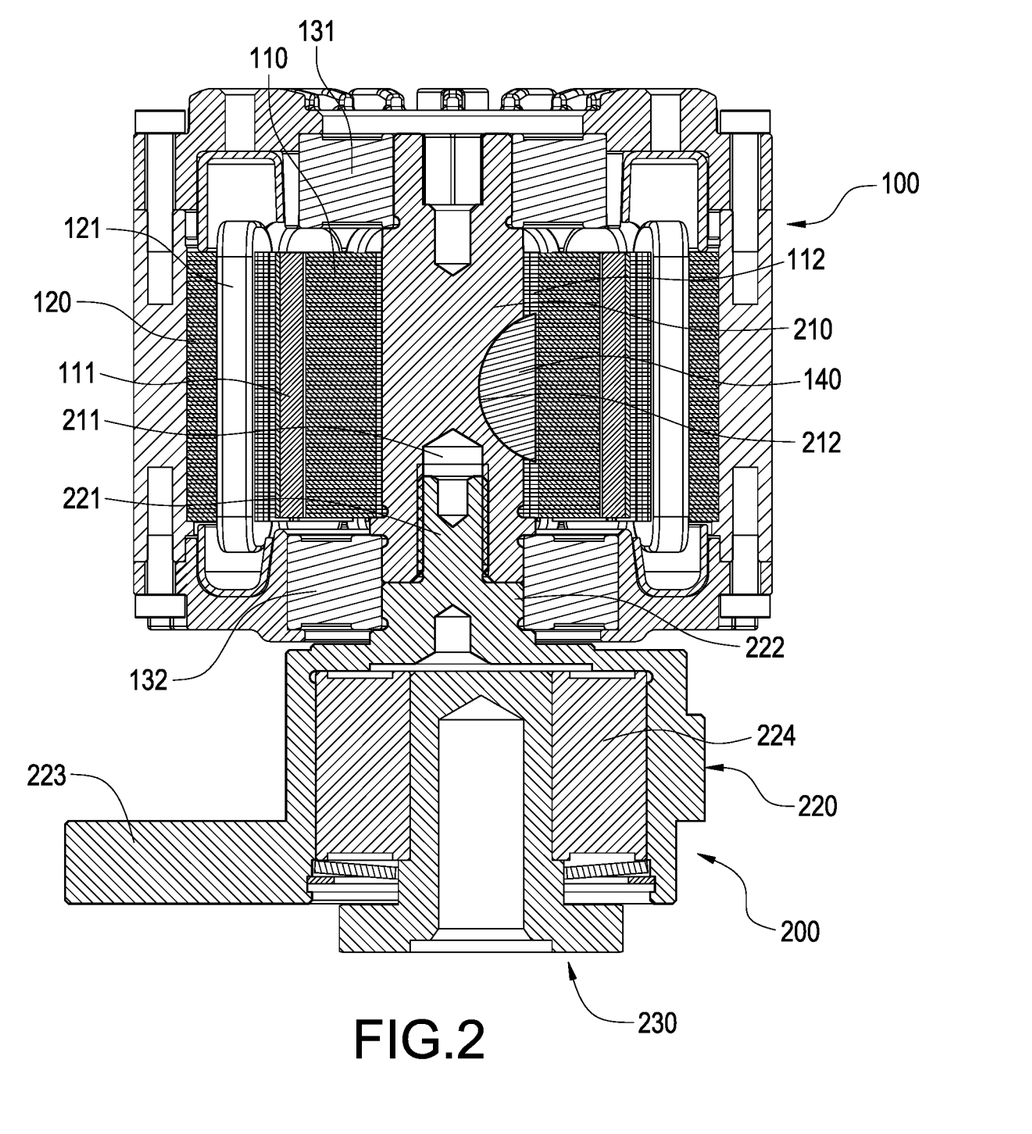
FIG. 2 is a longitudinal cross-sectional view of the electric sander motor according to an exemplary embodiment of the present invention.

As shown in FIG. 1 and FIG. 2, an exemplary embodiment of the present invention provides an electric sander motor comprising a motor main body 100 and an eccentric transmission assembly 200.

The motor main body 100 includes a rotor 110 and a stator 120 configured to surround the rotor 110. The stator 120 is preferably of a cylindrical shape, and it comprises a plurality of coils 121 arranged to surround the rotor 110. The rotor 110 is preferably of a cylindrical shape, and an inner side of the rotor 110 includes an inner locking slot 112. In addition, the rotor 110 comprises a plurality of magnets 111 arranged in a ring shape. The motor main body 110 includes at least one bearing 131/132 arranged therein. In an exemplary embodiment, the motor main body 100 preferably includes a pair of bearings 131 and 132.

As shown in FIG. 2 to FIG. 7, the eccentric transmission assembly 200 comprises a power axial shaft 210, a sleeve 220 and an output axle 230.

Figure 2A:
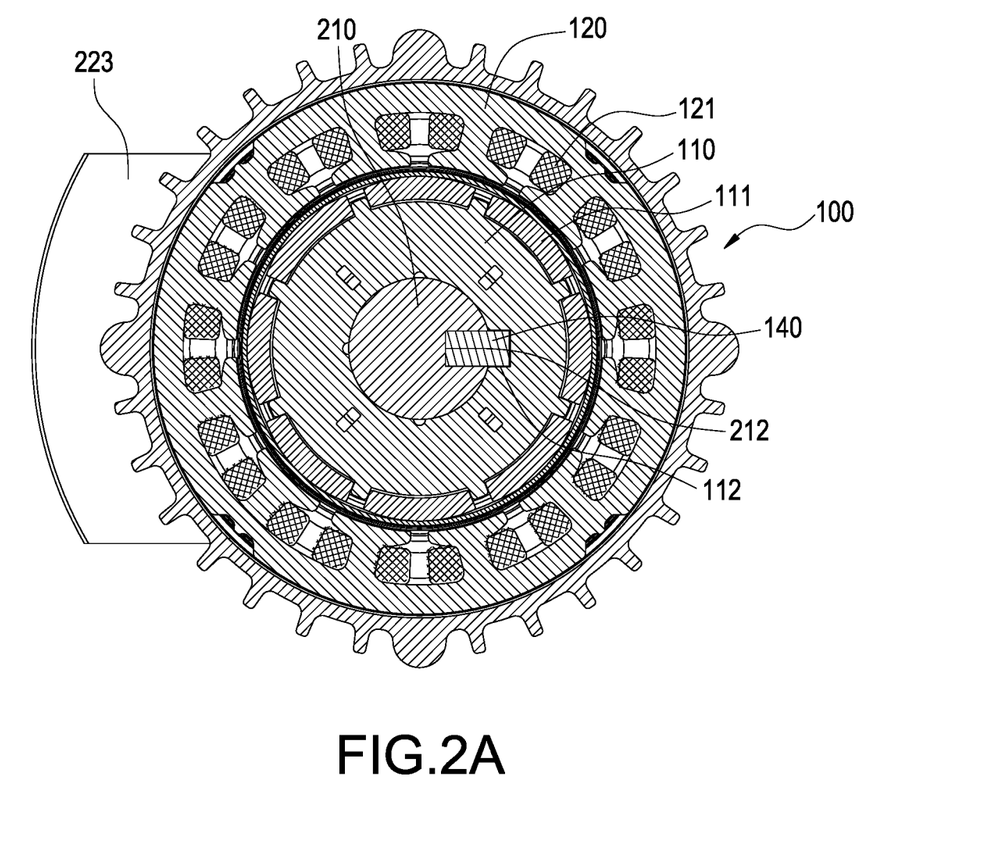
FIG. 2A is a lateral cross-sectional view of the electric sander motor according to an exemplary embodiment of the present invention.
Figure 3:
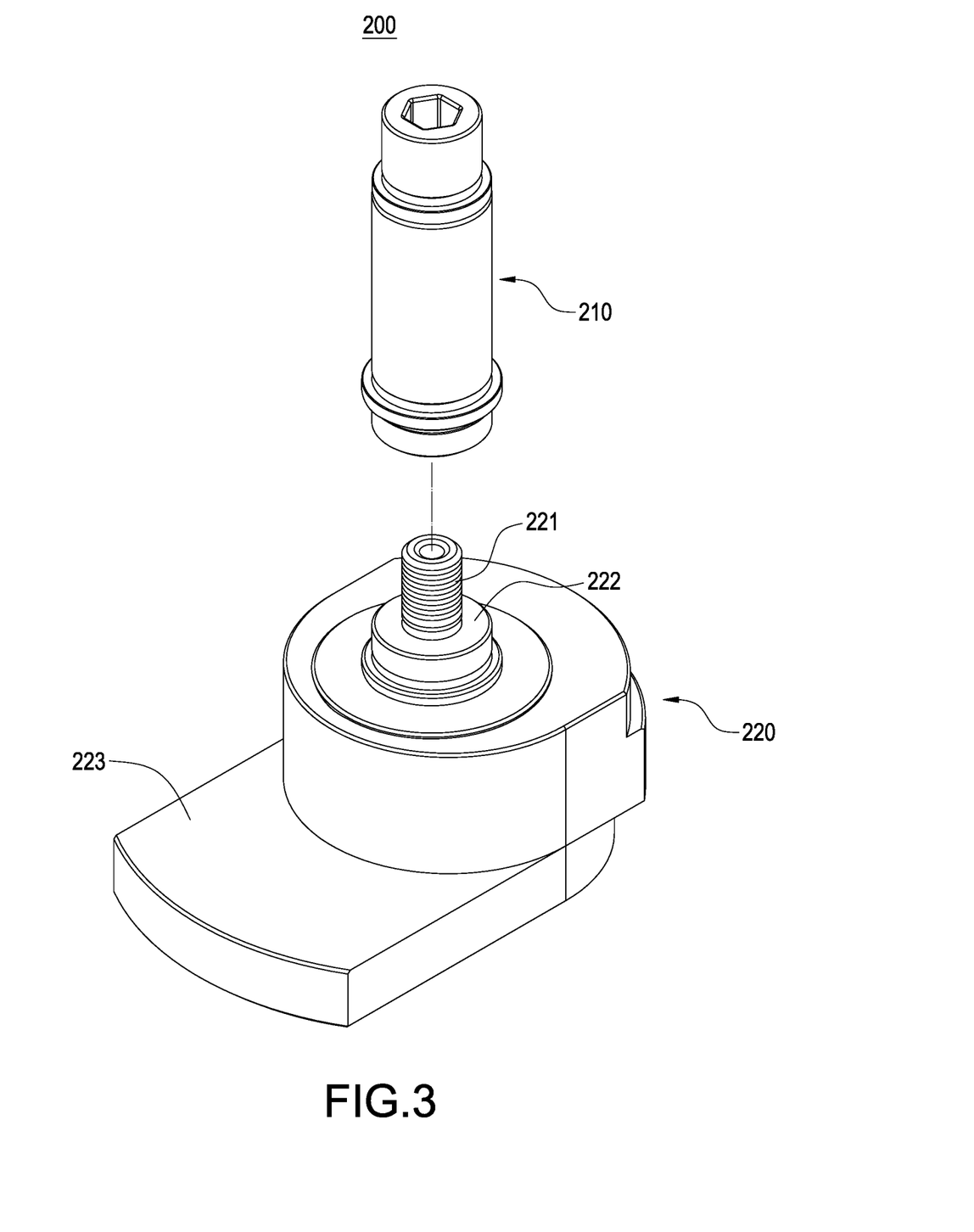
FIG. 3 and FIG. 4 are perspective exploded views of the eccentric transmission assembly of the electric sander motor according to an exemplary embodiment of the present invention.
Figure 4:
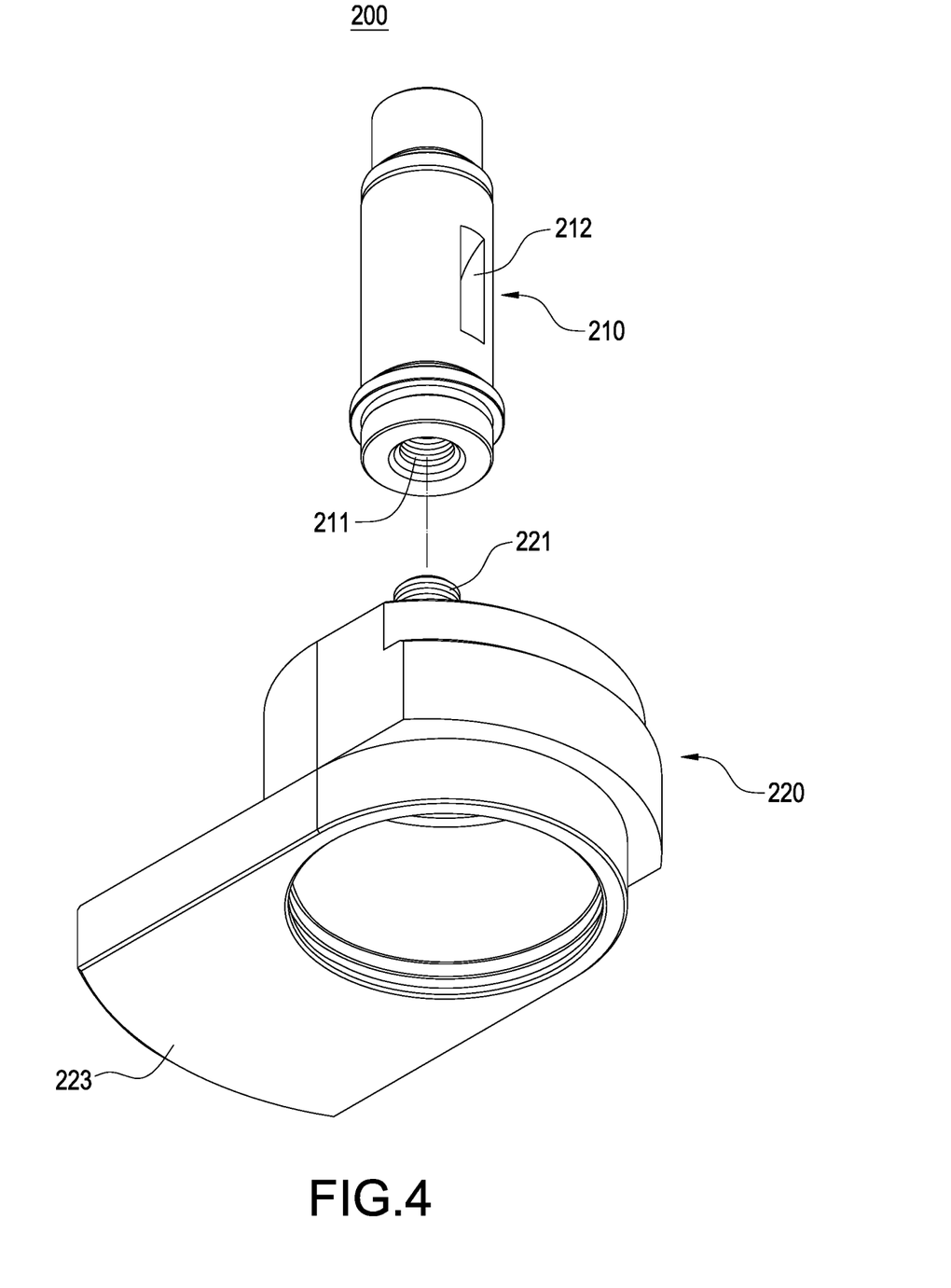
Figure 5:
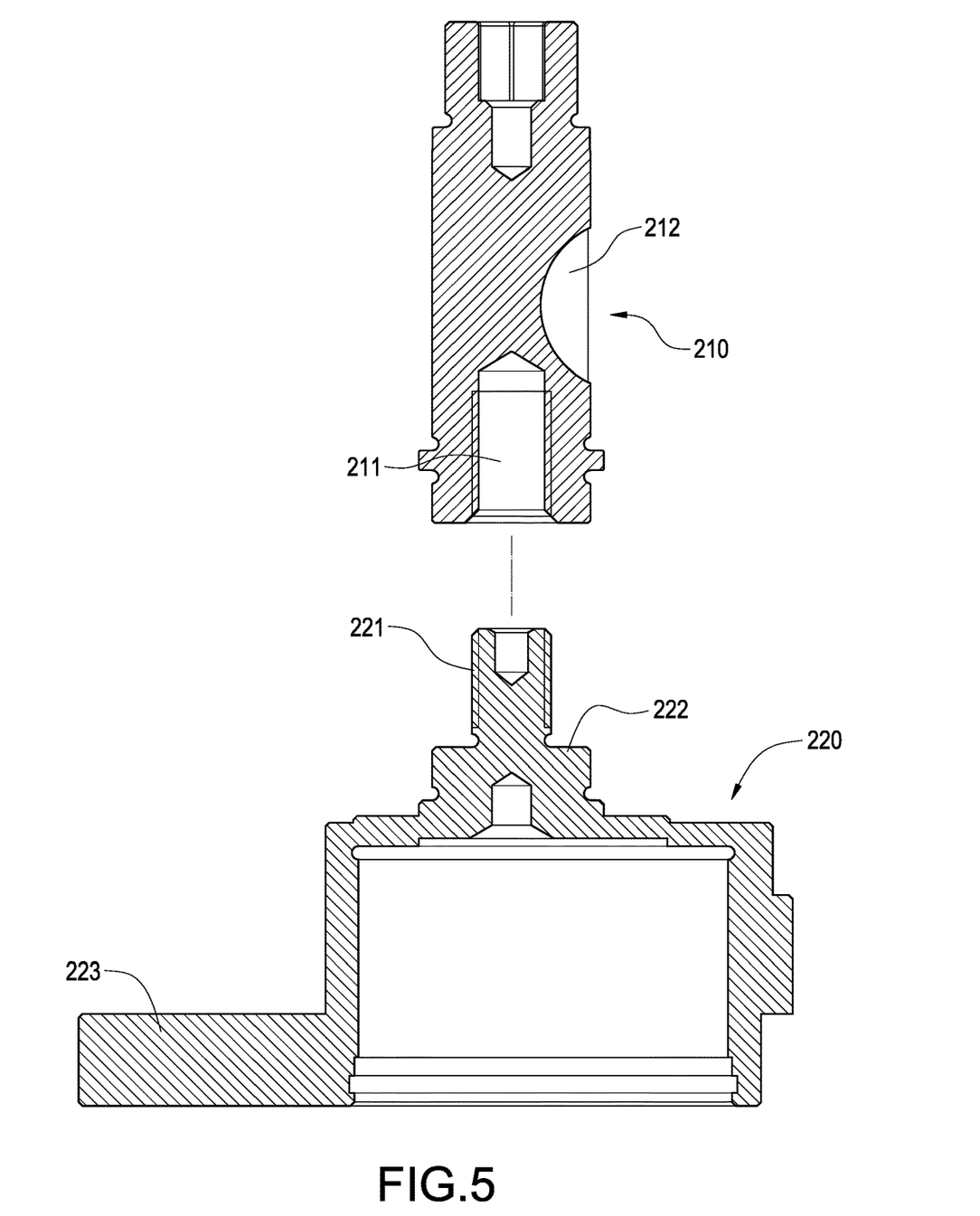
FIG. 5 is an exploded cross-sectional view of the eccentric transmission assembly of the electric sander motor according to an exemplary embodiment of the present invention.
Figure 6:
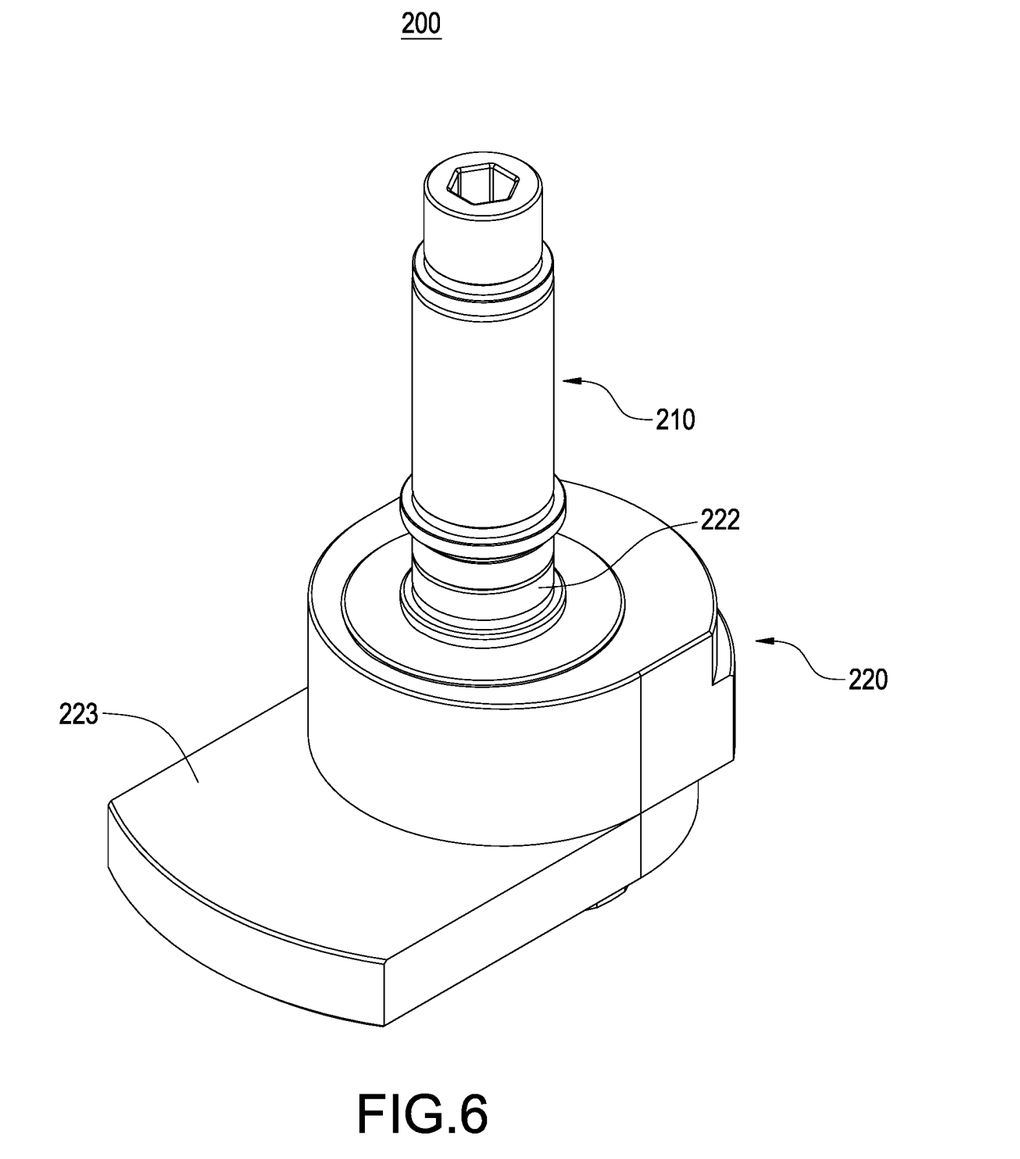
FIG. 6 is a perspective view of the eccentric transmission assembly of the electric sander motor according to an exemplary embodiment of the present invention.
Figure 7:
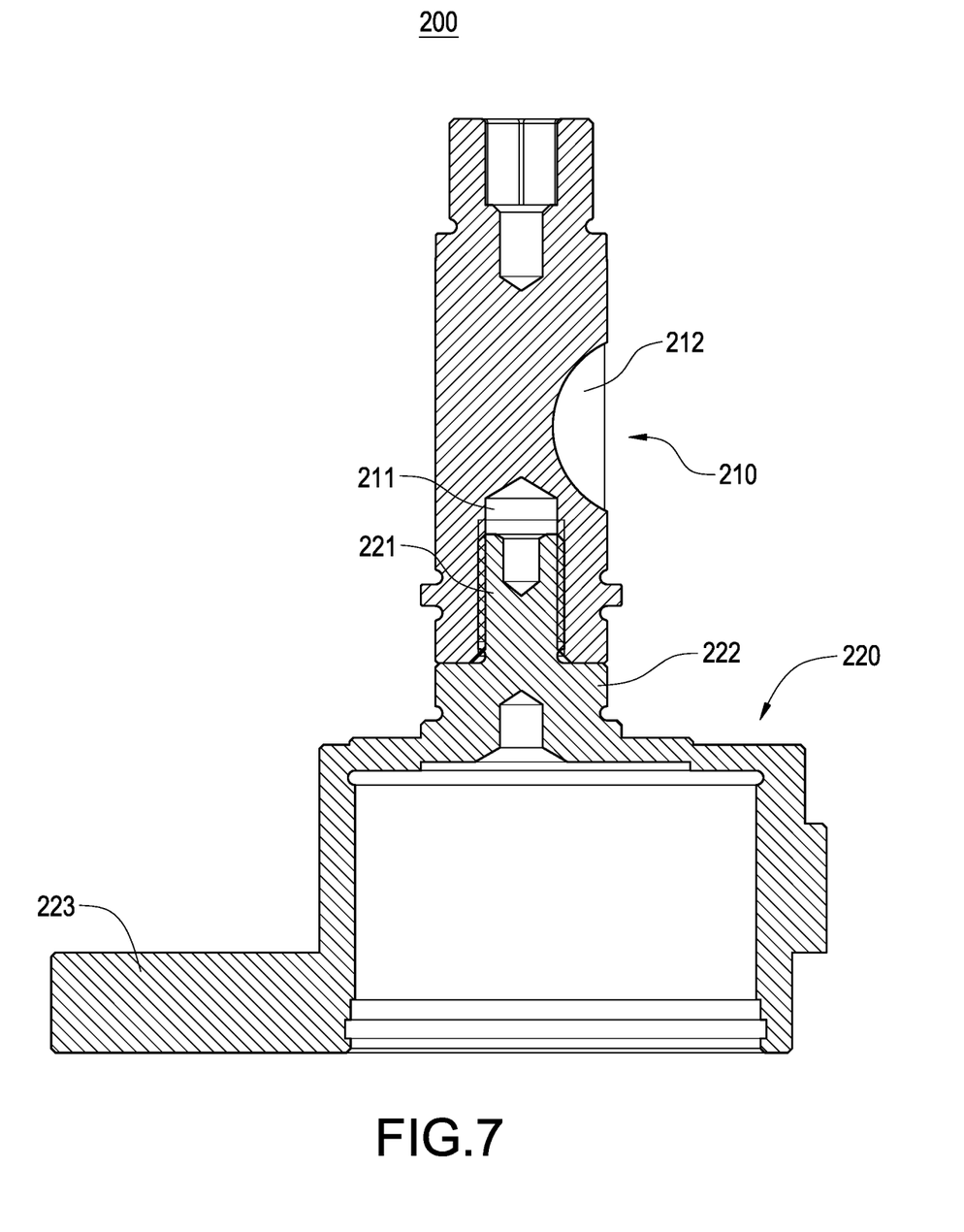
FIG. 7 is a cross-sectional view of the eccentric transmission assembly of the electric sander motor according to an exemplary embodiment of the present invention.

The power axial shaft 210 penetrates through the rotor 110, and two ends of the power axial shaft 210 penetrate through the pair of bearings 131/132, respectively. One end of the power axial shaft 210 includes an axial hole 211 formed thereon, and the axial hole 211 extends along a central axis of the power axial shaft 210. An outer side of the power axial shaft 210 includes an outer locking slot 212, and the rotor 110 is locked onto the power axial shaft 210 via a locking member 140. The locking member 140 is locked into the inner locking slot 112 and the outer locking slot 212. Accordingly, the magnets 111 of the rotor 110 can be arranged to surround the power axial shaft 210. Specifically, the inner locking slot 112 is a longitudinal slot formed on an internal surfaced of the cylindrical rotor 110, a part of the locking member 140 is embed in the outer locking slot 212 and thereby fixed on the power axial shaft 210. The outer locking slot 212 is aligned to the inner locking slot 112 (as shown in FIG. 2A) when the power axial shaft 210 is inserted into the rotor 110, and another part of the locking member 140 protruded on the power axial shaft 210 therefore could be moved into the inner locking slot 112, and the locking member 140 is thereby locked into the inner locking slot 112 and the outer locking slot 212.

The sleeve 220 includes one end configured to be an open end and another end configured to be a closed end and extended outward to form an eccentric axial shaft 221. The central axis of the eccentric axial shaft 221 is arranged parallel with the central axis of the sleeve 220 and spaced apart from each other. In addition, the eccentric axial shaft 221 penetrates through the axial hole 211 in order to connect the sleeve 220 to the power axial shaft 210. In an exemplary embodiment, the sleeve 220 is arranged outside the motor main body 100, and the eccentric axial shaft 221 is preferably fastened onto the axial hole 211 in order to be coaxially fastened and connected to the power axial shaft 210, such that the sleeve 220 is eccentrically connected to the power axial shaft 210. A root portion of the eccentric axial shaft 221 includes a protruding boss 222 extended in a radial direction. Furthermore, both the protruding boss 222 and one end of the power axial shaft 210 connected to the eccentric axial shaft 221 penetrate into one identical bearing 132. One side of the sleeve 200 includes a counter weight 223, and the central axis of the counter weight 223 and the central axis of the sleeve 220 are arranged opposite from each other to be at two sides of the eccentric axial shaft 221, respectively.

In an exemplary embodiment, the output axle 230 penetrates into the sleeve 220 via the open end of the sleeve 220 and is arranged coaxially with the sleeve 220. Preferably, the sleeve 220 includes a bearing 224 therein and the output axle 230 penetrates through this bearing 224. Accordingly, the output axle 230 is able to rotate relative to the sleeve 220. The output axle 230 is provided for connecting to a conventional sanding rotary disk (not shown in the drawings), and the output axle 230 is preferably connected to a center of the sanding rotary disk.

When the rotor 110 of the motor main body 100 rotates relative to the stator 120, it is able to drive the sanding rotary disk to rotate around the power axial shaft 210, and the sanding rotary disk also rotates around the output axle 230 on its own. When the sanding rotary disk is driven to rotate around the power axial shaft 210, the counter weight 223 on the sleeve 220 is able to balance the torque generated by the rotation of the sanding rotary disk.

The electric sander motor of the present invention and its eccentric transmission assembly 200 are equipped with the power axial shaft 210 and the sleeve 220 assembled to connect to each other. During the assembly, the power axial shaft 210 is assembled onto the motor main body 100 first, following which the sleeve 220 is then assembled onto the power axial shaft 210. According, with such configuration, it is able to prevent the sleeve 220 from hindering the penetration of the power axial shaft 210 into the motor main body 100, thereby facilitating the assembly process. Furthermore, sleeves 220 of different sizes can be used and universally connected to the power axial shaft 210, such that the manufacturing cost can be further reduced. Moreover, the motor of the present disclosure having an eccentric transmission assembly could be also applied in a polisher.

The above describes the preferable and feasible exemplary embodiments of the present invention for illustrative purposes only, which shall not be treated as limitations of the scope of the present invention. Any equivalent changes and modifications made in accordance with the scope of the claims of the present invention shall be considered to be within the scope of the claim of the present invention.

What is claimed is:

1. An electric sander motor, comprising:
   a motor main body (100) having a rotor (110) and a stator (120) configured to surround the rotor (110) therein;
   a power axial shaft (210) having one end formed of an axial hole (211) thereon, the axial hole (211) extended along a central axis of the power axial shaft (210); and
   a sleeve (220) having one end configured to be an open end and another end configured to be a closed end and extended outward to form an eccentric axial shaft (221) penetrating through the axial hole (211); a central axis of the eccentric axial shaft (221) arranged parallel with a central axis of the sleeve (220) and spaced apart from each other;
   wherein the power axial shaft (210) penetrates through the rotor (110), and the sleeve (220) is arranged outside the motor main body (100).

2. The electric sander motor according to claim 1, further comprising an output axle (230); the output axle (230) is arranged coaxially with the sleeve (220).

3. The electric sander motor according to claim 2, wherein the sleeve (220) includes a bearing (224) therein, and the output axle (230) penetrates through the bearing (224).

4. The electric sander motor according to claim 1, wherein the eccentric axial shaft (221) is fastened onto the axial hole (211).

5. The electric sander motor according to claim 1, wherein one side of the sleeve (220) includes a counter weight (223), and a central axis of the counter weight (223) and the central axis of the sleeve (220) are arranged opposite from each other to be at two sides of the eccentric axial shaft (221), respectively.

6. The electric sander motor according to claim 1, wherein the stator (120) comprises a plurality of coils (121) arranged to surround the rotor (110).

7. The electric sander motor according to claim 1, wherein the rotor (110) comprises a plurality of magnets (111) arranged to surround the power axial shaft (210).

8. The electric sander motor according to claim 1, wherein the motor main body (100) includes at least one bearing (131/132) arranged therein, and the power axial shaft (210) penetrates through the bearing (131/132).

9. The electric sander motor according to claim 8, wherein a root portion of the eccentric axial shaft (221) includes a protruding boss (222) extended in a radial direction, and the protruding boss (222) penetrates through the bearing (131/132).

10. The electric sander motor according to claim 1, wherein an inner side of the rotor (110) includes an inner locking slot (112), and an outer side of the power axial shaft (210) includes an outer locking slot (212); the rotor (110) is locked onto the power axial shaft (210) via a locking member (140); the locking member (140) is locked into the inner locking slot (112) and the outer locking slot (212).

\* \* \* \* \*